US010731774B2

(12) United States Patent
Taylor et al.

(10) Patent No.: US 10,731,774 B2
(45) Date of Patent: Aug. 4, 2020

(54) VALVE ASSEMBLIES PRINCIPALLY FOR IN-FLOOR SWIMMING POOL CLEANING SYSTEMS

(71) Applicant: Zodiac Pool Systems LLC, Carlsbad, CA (US)

(72) Inventors: Devin Taylor, Bountiful, UT (US); Bradley Swann, San Marcos, CA (US); Nathan Dewyea, Sandy, UT (US); LaMont Dreschel, Salt Lake City, UT (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 0 days.

(21) Appl. No.: 16/255,022

(22) Filed: Jan. 23, 2019

(65) Prior Publication Data

US 2019/0301636 A1    Oct. 3, 2019

Related U.S. Application Data

(60) Provisional application No. 62/648,736, filed on Mar. 27, 2018.

(51) Int. Cl.
| | |
|---|---|
| *E04H 4/16* | (2006.01) |
| *F16K 31/53* | (2006.01) |
| *F16H 27/06* | (2006.01) |
| *F16K 11/074* | (2006.01) |

(Continued)

(52) U.S. Cl.
CPC ............. *F16K 31/535* (2013.01); *E04H 4/12* (2013.01); *E04H 4/1236* (2013.01); *E04H 4/16* (2013.01); *E04H 4/169* (2013.01); *F16H 27/06* (2013.01); *F16K 11/074* (2013.01); *F16K 31/043* (2013.01); *E04H 4/1663* (2013.01)

(58) Field of Classification Search
None
See application file for complete search history.

(56) References Cited

U.S. PATENT DOCUMENTS

| | | | |
|---|---|---|---|
| 4,077,424 A | 3/1978 | Ehret et al. | |
| 4,589,986 A * | 5/1986 | Greskovics | ........... E04H 4/1654 15/1.7 |

(Continued)

FOREIGN PATENT DOCUMENTS

WO    9840042    9/1998

OTHER PUBLICATIONS

PCT/US2019/024106, "International Search Report and Written Opinion", Aug. 12, 2019, 16 pages.

(Continued)

*Primary Examiner* — Robert K Arundale
(74) *Attorney, Agent, or Firm* — Kilpatrick Townsend & Stockton LLP; Dean W. Russell

(57) ABSTRACT

Detailed are valve assemblies principally for use as part of in-floor cleaning systems for swimming pools. The assemblies may use mechanisms for converting continuous rotation into discontinuous rotation, changing the timing of water distribution to different outlet of the assemblies. One such mechanism includes both an impeller, whose blades are rotated continuously by impingement of pressurized water, and a Geneva drive, whose driven wheel is rotated discontinuously by one or more associated drive wheels.

11 Claims, 3 Drawing Sheets

(51) Int. Cl.
*E04H 4/12* (2006.01)
*F16K 31/04* (2006.01)

(56) References Cited

U.S. PATENT DOCUMENTS

| | | | |
|---|---|---|---|
| 5,881,403 A * | 3/1999 | Moreland | A61H 33/02 |
| | | | 4/541.1 |
| 8,590,071 B1 | 11/2013 | Lopez | |
| 8,714,182 B2 | 5/2014 | Malinasky, Jr. | |
| 8,984,677 B1 | 3/2015 | Lopez | |
| 9,625,041 B1 | 4/2017 | Lopez | |
| 2014/0259466 A1* | 9/2014 | Renaud | E04H 4/1663 |
| | | | 15/1.7 |
| 2016/0174803 A1* | 6/2016 | Vines | A47L 9/20 |
| | | | 95/20 |

OTHER PUBLICATIONS

International Application No. PCT/US2019/024106, Invitation to Pay Additional Fees and, Where Applicable, Protest Fee dated Jun. 14, 2019, 9 pages.

* cited by examiner

VALVE ASSEMBLIES PRINCIPALLY FOR IN-FLOOR SWIMMING POOL CLEANING SYSTEMS

CROSS-REFERENCE TO RELATED APPLICATION

This application claims the benefit of and priority to U.S. Provisional Patent Application Ser. No. 62/648,736, filed Mar. 27, 2018, and having the same title as appears above, the entire contents of which application are hereby incorporated herein by this reference.

FIELD OF THE INVENTION

This invention relates to valves and more particularly, although not necessarily exclusively, to valve assemblies having Geneva drives for distributing water to multiple outlet ports.

BACKGROUND OF THE INVENTION

U.S. Pat. No. 4,077,424 to Ehret, et al., discloses a conventional water-distribution valve assembly. The valve assembly includes a housing defining a chamber in which a centrally-located vertical spindle extends. Fixed to the spindle for rotation in the chamber is an impeller. In use, pressurized water passing through an inlet of the housing rotates blades of the impeller, which in turn rotate the spindle and two gear assemblies. See Ehret, col. 2,1. 48 to col. 3,1. 7; col. 4,11. 42-50. As noted in the Ehret patent, rotation of the gear assemblies . . . imports a rotational movement to [a] platform and, therefore, [a] valve disc at a lower speed than that of the impeller. As a result, the valve disc rotates relatively slowly but with a relatively high torque in a counterclockwise direction . . . , whereby [a] slot successively exposes . . . outlets to permit fluid to pass therethrough, while sealing the remaining portion of the outlets.
See id., col. 4,11. 53-61 (numerals omitted).

Illustrated in U.S. Pat. No. 8,714,182 to Malinasky, Jr. is another valve assembly for an in-floor pool cleaning system. It too includes a housing, an inlet port, and a plurality of outlet ports. See Malinasky, Jr., col. 3,11. 55-56. As with the assembly of the Ehret patent, that of the Malinasky, Jr. patent operates by passing pressurized water through the inlet port so as to rotate blades of an impeller and ultimately rotate a plate. See id., col. 5, 11. 5-12. Rotation of the plate changes its position relative to the outlet ports, with an aperture of the plate allowing the water to exit through one of the outlet ports. See id., col. 7, 11. 5-11.

For water at constant pressurization, valve assemblies of both the Ehret and Malinasky, Jr. patents are designed to produce continuous, uniform rotation of the disc or plate. Consequently, these assemblies distribute water to any particular outlet port for only relatively short periods of time and transfer between outlet ports relatively slowly. Beneficial, therefore, would be a valve assembly which allows distribution of water to a particular outlet port for a longer period of time and transfers between outlet ports more quickly.

SUMMARY OF THE INVENTION

The present invention seeks to provide such a beneficial valve assembly principally for use as part of an in-floor cleaning system of a swimming pool or spa. Rather than utilizing a continuously-rotating plate, assemblies of the invention may employ a Geneva drive. This sort of drive mechanism effectively translates continuous rotational movement to discontinuous, intermittent rotary motion of an associated plate. As a result, water distribution may occur through a particular outlet until the next intermittent rotation of the driven wheel of the Geneva drive occurs. Moreover, when the next intermittent rotation of the driven wheel happens, water distribution relatively rapidly switches to the adjacent outlet.

It thus is an optional, non-exclusive object of the present invention to provide valve assemblies for distributing fluid sequentially to multiple outlets.

It is also an optional, non-exclusive object of the present invention to provide valve assemblies for in-floor swimming pool cleaning systems in which continuous rotational motion is converted to discontinuous rotational motion.

It is another optional, non-exclusive object of the present invention to provide valve assemblies utilizing a Geneva drive to produce such discontinuous rotary motion.

Other objects, features, and advantages of the present invention will be apparent to those skilled in the relevant art with reference to the remaining text and the drawings of this application.

DETAILED DESCRIPTION

Figure 1:
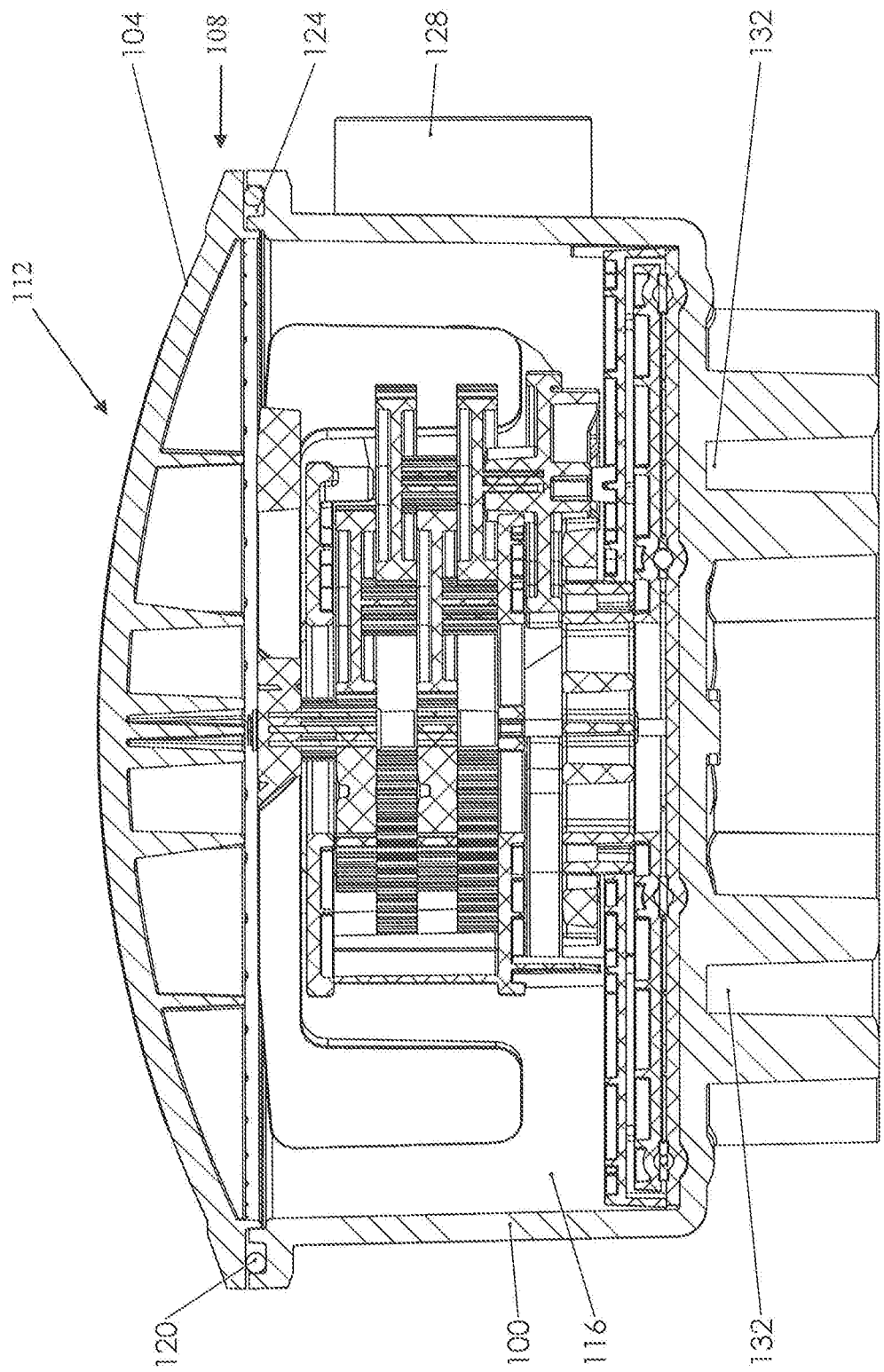
FIG. 1 is a cross-sectional view of an exemplary valve assembly of the present invention.
Figure 3:
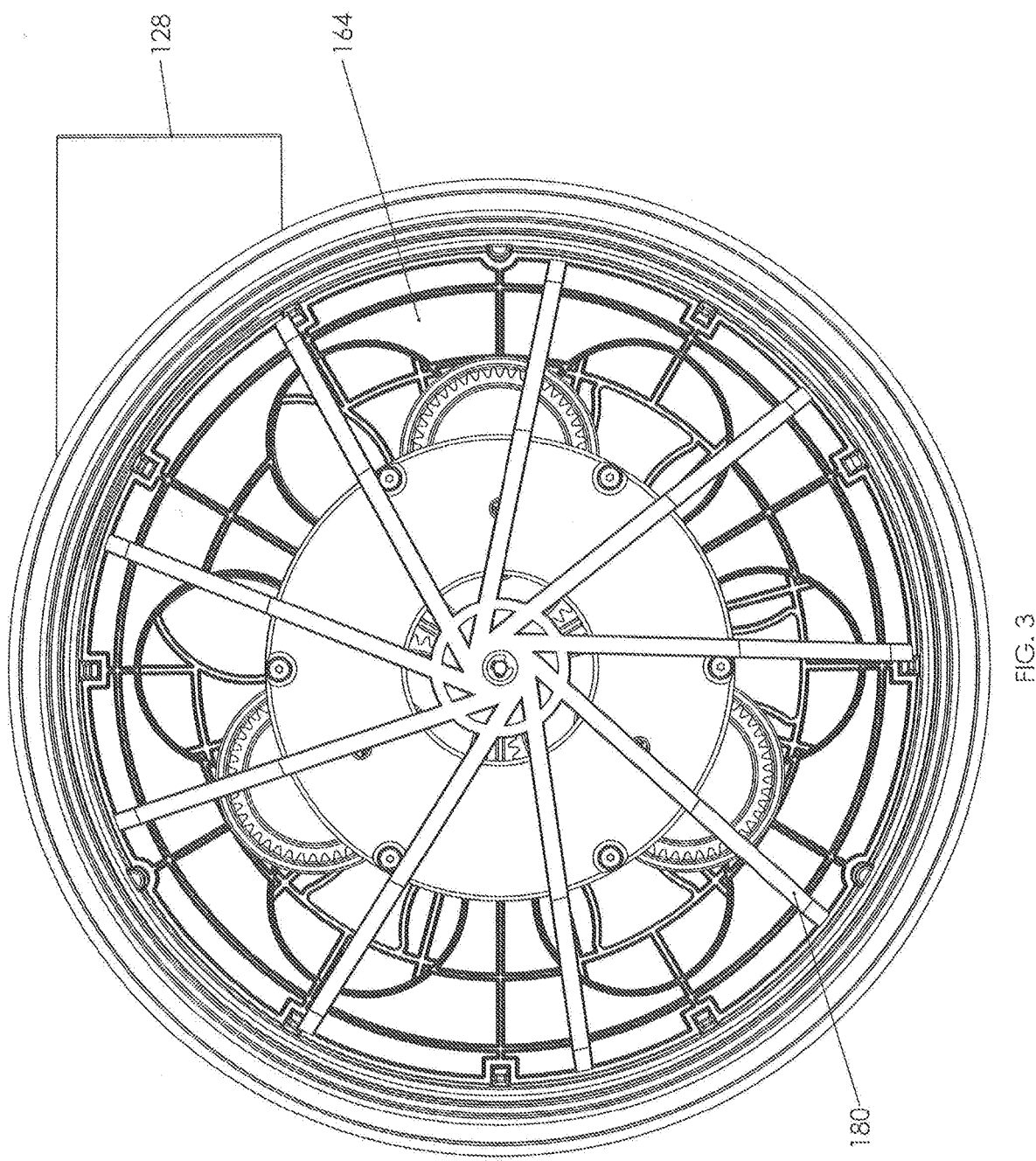
FIG. 3 is a top plan view of the valve assembly of FIG. 1 with a cover removed for clarity.

Depicted especially in FIG. 1 are base 100 and cover 104, which collectively form a housing 108 of valve assembly 112. Base 100 and cover 104 may attach in any suitable manner so as to form an interior chamber 116. Such attachment need not necessarily be permanent, however, as when access to chamber 116 may be desirable for component repair or replacement, for example. FIG. 1 also illustrates placement of o-ring 120 in groove 124 of base 100 to facilitate sealing of cover 104 and base 100. Pressurized water enters assembly 112 through inlet 128 of base 100 (see also FIG. 3) and, as the assembly 112 operates, may exit through outlets 132.

Figure 2:
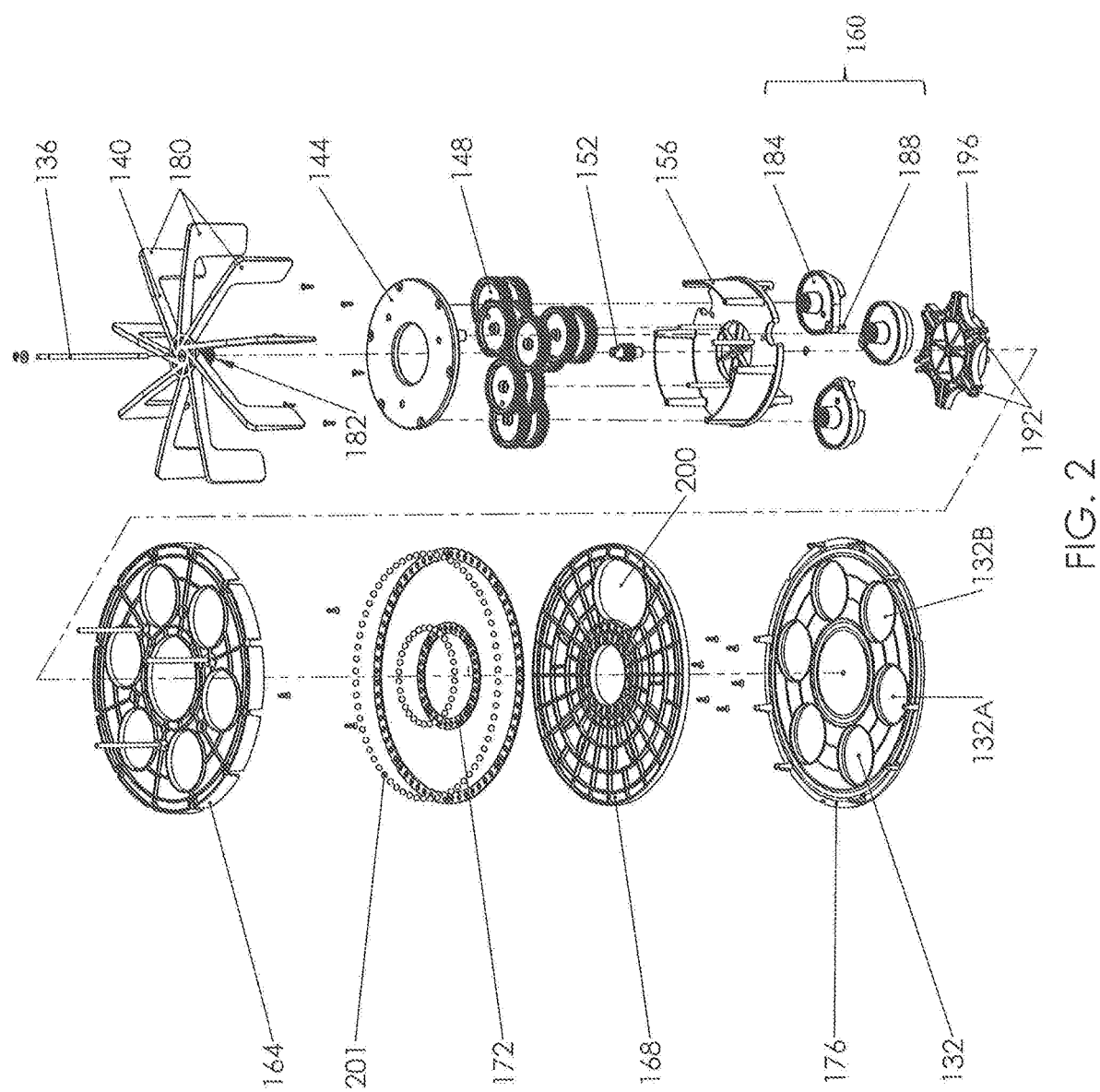
FIG. 2 is an exploded perspective view of internal portions of the valve assembly of FIG. 1.

Well illustrated in FIG. 2 are components of valve assembly 112 present within chamber 116. Included among these components may be shaft 136, impeller 140, upper gear case 144, gear assembly 148, synchronizer gear 152, lower gear case 156, Geneva drive 160, upper cassette 164, valve plate 168, inner bearing cage assembly 172 (which may include bearings 201 supporting valve plate 168), and lower cassette 176. As shown in FIG. 2, lower cassette 176 contains six outlets 132, two exemplary adjacent outlets being labelled 132A and 132B. Persons skilled in the art will, of course, understand that assembly 112 may contain more or fewer than six outlets 132 if appropriate or desired.

Shaft 136 advantageously is located centrally within chamber 116. Affixed to or contacting shaft 136 may be impeller 140, gear assembly 148, synchronizer gear 152, Geneva drive 160, and lower cassette 176. Various other connections of components within chamber 116 and exemplary connectors and fasteners also are depicted in FIG. 2. Similar to operation of the valve assembly of the Ehret patent, assembly 112 relies on pressurized water entering chamber 116 via inlet 128 to impinge upon and rotate blades 180 of impeller 140. Rotation of impeller 140 rotates its gear 182, in turn rotating gears of assembly 148 and synchronizing gear 152.

Gearing of the present invention does not directly drive valve plate 168, however. Instead, the gearing serves to rotate drive wheels 184 of Geneva drive 160. This rotation causes a pin 188 of each wheel 184 eventually to engage one of a plurality of slots 192 of driven wheel 196 of the Geneva drive 160. As a pin 188 engages a slot 192, continued rotation of its corresponding drive wheel 184 causes driven wheel 196 to rotate (in the opposite direction) until the pin 188 no longer engages the slot 192. Driven wheel 196 thence will cease rotation until another pin 188 engages a slot 192.

In this manner, driven wheel 196 is caused to rotate discontinuously. By connecting Geneva drive 160 to valve plate 168, the valve plate 168 likewise will rotate discontinuously. Consequently, its aperture 200 will rotate to a particular location-aligned with outlet 132A, for example, remain there for an extended period, and then rotate relatively quickly so as to be aligned with adjacent outlet 132B.

As shown in FIG. 2, a presently-preferred Geneva drive 160 includes three drive wheels 184 and a driven wheel 196 having six slots 192. Including three drive wheels 184 is not strictly necessary, however, as more or fewer wheels 184 may be employed instead. Likewise, driven wheel 196 may have more or fewer than six slots 192. Geneva drive 160 similarly need not necessarily be constructed exactly as depicted in FIG. 2, as the present invention envisions other methods of converting continuous rotational motion to discontinuous rotational motion.

The diameter of aperture 200 advantageously is at least as large as the diameter of each outlet 132. Aperture 200 additionally may be elongated (so as, e.g., to form an ellipse or oval) so that its overall area is larger than that of an outlet 132 and the fluid opening it furnishes spans the space between adjacent outlets such as outlets 132A and 132B. In this way, aperture 200 is never wholly blocked by that space between outlets 132, thus allowing water to exit for pressure relief even as aperture 200 rotates.

Exemplary concepts and combinations of features of the invention may include:
A. A valve assembly including a mechanism for converting continuous rotation to discontinuous rotation.
B. An in-floor pool cleaning system including a valve assembly comprising both an impeller and a Geneva drive.
C. A valve assembly in which pressurized liquid impinges on blades of an impeller connected directly or indirectly to a Geneva drive, with continuous rotation of the impeller producing discontinuous rotation of a driven wheel of the Geneva drive.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

The foregoing is provided for purposes of illustrating, explaining, and describing embodiments of the present invention. Modifications and adaptations to these embodiments will be apparent to those skilled in the art and may be made without departing from the scope or spirit of the invention. Additionally, the word "pool" and phrase "swimming pool" as used herein may include vessels such as spas and hot tubs within its definition, and "pressurized" water is water whose pressure is above that generally of the water in the vessel to be cleaned. Finally, the entire contents of the Ehret and Malinasky, Jr. patents are incorporated herein by this reference.

What is claimed is:

1. An in-floor pool cleaning system including a valve assembly comprising:
   a. an impeller; and
   b. a Geneva drive comprising:
      i. a driven wheel comprising a plurality of slots; and
      ii. a plurality of rotatable drive wheels, each of the plurality of rotatable drive wheels including a pin configured at times to engage a slot of the plurality of slots as the plurality of rotatable drive wheels rotate.

2. An in-floor pool cleaning system according to claim 1 further comprising a housing (i) containing the impeller and the Geneva drive and (ii) defining a fluid inlet.

3. An in-floor pool cleaning system according to claim 2 in which the housing further defines a plurality of fluid outlets.

4. An in-floor pool cleaning system according to claim 1 in which, when a drive wheel of the plurality of drive wheels rotates in a first direction and the pin of the drive wheel engages a slot of the plurality of slots, the driven wheel rotates in a second direction opposite the first direction.

5. An in-floor pool cleaning system according to claim 4 further comprising a valve plate (i) connected to the Geneva drive and (ii) defining an aperture.

6. An in-floor pool cleaning system according to claim 5 further comprising a housing (i) containing the impeller and the Geneva drive and (ii) defining a fluid inlet and a plurality of fluid outlets and in which the aperture is configured to align with at least one of the plurality of fluid outlets at times in use.

7. An in-floor pool cleaning system according to claim 6 in which (i) the plurality of fluid outlets comprises at least a first fluid outlet and a second fluid outlet adjacent to the first fluid outlet but spaced therefrom and (ii) the aperture spans the space between the adjacent first and second fluid outlets.

8. An in-floor pool cleaning system according to claim 7 in which the impeller comprises a plurality of blades impinged upon by pressurized water entering the housing through the fluid inlet.

9. An in-floor pool cleaning system according to claim 1 in which the impeller includes a gear, further comprising:
   a. a housing (i) containing the impeller and the Geneva drive, (ii) defining a fluid inlet, and (iii) defining a plurality of fluid outlets;
   b. a valve plate (i) connected to the Geneva drive and (ii) defining an aperture configured at times in use to align with at least one of the plurality of fluid outlets;
   c. a shaft connected to the gear of the impeller;
   d. a synchronizer gear connected to the shaft; and
   e. a gear assembly connected to the shaft.

10. An in-floor cleaning system according to claim 9 in which the at least one of the plurality of fluid outlets is circular, the aperture is elongated, and an area of the aperture is larger than an area of the at least one of the plurality of fluid outlets.

11. A valve assembly comprising (a) a Geneva drive having (i) a driven wheel and (ii) a plurality of rotatable drive wheels, each of the plurality of rotatable drive wheels including a pin configured at times to engage a slot of the plurality of slots as the plurality of rotatable drive wheels rotate; and (b) an impeller (i) having blades and (ii) connected directly or indirectly to the Geneva drive; and in which pressurized liquid impinges on the blades of the impeller, with continuous rotation of the impeller producing discontinuous rotation of the driven wheel of the Geneva drive.

\* \* \* \* \*